(12) United States Patent
Rosen et al.

(10) Patent No.: US 6,594,433 B2
(45) Date of Patent: Jul. 15, 2003

(54) OPTICAL COMPONENT MOUNTING BRACKET

(75) Inventors: Brett Rosen, Richboro, PA (US); Robert Joseph Chilton, Abington, PA (US); Warren Panama Johnson, Wilmington, DE (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/735,583

(22) Filed: Dec. 13, 2000

(65) Prior Publication Data

US 2002/0071640 A1 Jun. 13, 2002

(51) Int. Cl.⁷ .................................................. G02B 6/00
(52) U.S. Cl. ..................... 385/134; 385/88; 385/136; 385/137; 385/147; 248/205.1; 248/229.1; 108/28; 108/29; 108/30
(58) Field of Search .................. 385/134, 136, 385/137, 147, 88; 248/205.1, 229.1; 108/28, 29, 30

(56) References Cited

U.S. PATENT DOCUMENTS

| 4,311,359 | A | * | 1/1982 | Keller ........................ 350/96.2 |
| 5,013,911 | A | * | 5/1991 | Koshida et al. ............. 250/239 |
| 5,155,785 | A | * | 10/1992 | Holland et al. ............... 385/89 |
| 5,283,851 | A | * | 2/1994 | Vergnolle .................... 385/134 |
| 5,487,123 | A | * | 1/1996 | Fowble ......................... 385/70 |
| 6,086,265 | A | * | 7/2000 | Kuribayashi et al. ......... 385/92 |
| 6,270,262 | B1 | * | 8/2001 | Hudgins et al. ............... 385/88 |
| 6,287,128 | B1 | * | 9/2001 | Jones et al. ................. 439/76.1 |
| 6,390,690 | B1 | * | 5/2002 | Meis et al. .................... 385/88 |

* cited by examiner

Primary Examiner—Akm Enayet Ullah
Assistant Examiner—Jennifer Doan
(74) Attorney, Agent, or Firm—Volpe and Koenig, P.C.

(57) ABSTRACT

A bracket for mounting an optical component to a circuit board. The bracket comprises a bracket body member having a board contacting surface extending in a first plane defined along its board contacting side. A component mount is defined along the body member with a termination surface extending adjacent the board contacting side in a plane recessed from the first plane.

7 Claims, 3 Drawing Sheets

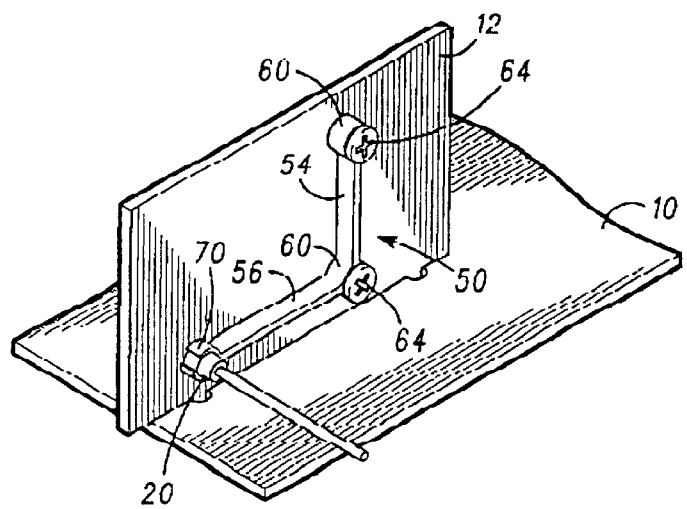
FIG. 6
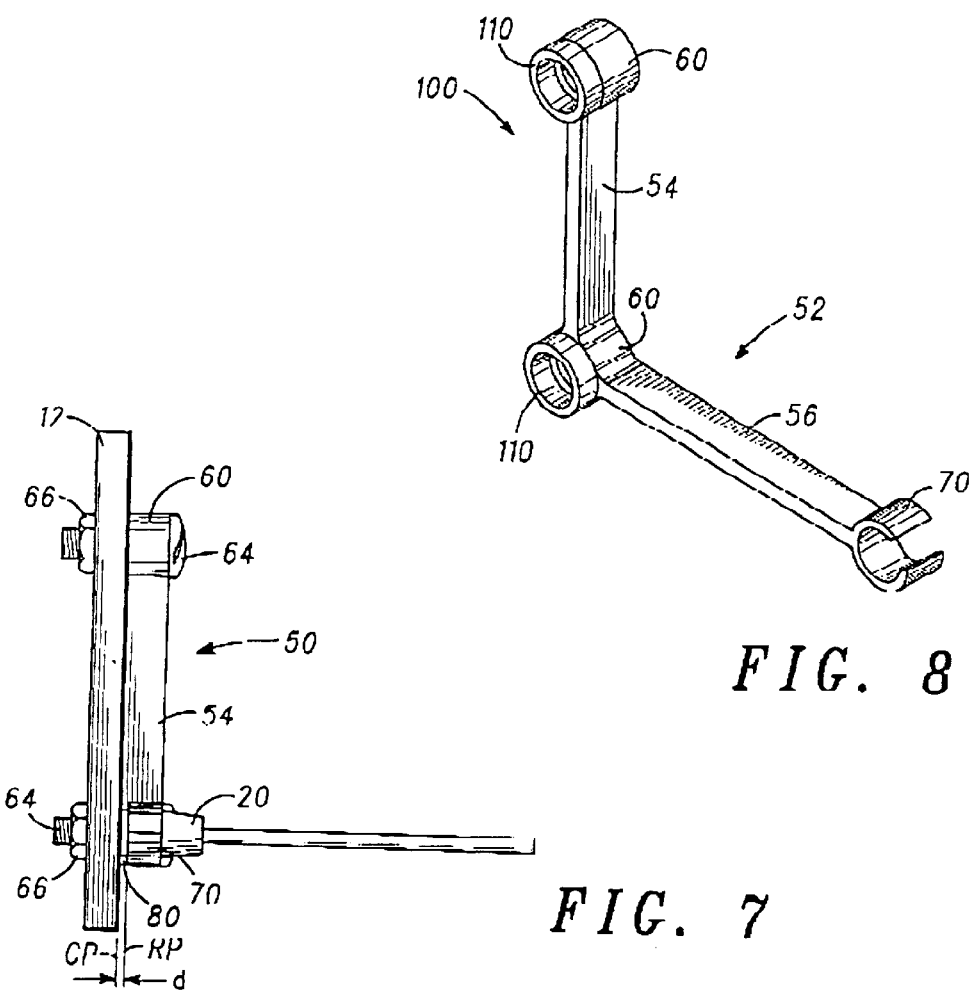
FIG. 8
FIG. 7

OPTICAL COMPONENT MOUNTING BRACKET

BACKGROUND

The present invention relates to a mounting bracket. More particularly, the present invention relates to a bracket for mounting an optical component relative to a circuit board.

Due to their ability to transmit large amounts of data, optical fibers are being used more frequently for data and optical transmission. The optical fibers are generally coupled with data processing circuitry, such that data or optical signals can be transferred between the optical fiber and the circuitry. In many applications, the circuitry may be provided on a daughter circuit board which is mounted vertically on a mother circuit board. As such, there is a need to mount the optical equipment, for example a photodiode or laser, relative to the circuitry on the daughter board. Due to the fine size of the fiber optics, it is necessary to mount the optic components with precision.

A prior art mounting arrangement is shown in FIG. 1. A daughter circuit board 12 is vertically mounted relative to a mother circuit board 10. A mounting bracket 14 is secured to the mother board 10 via screws 16 or the like. The mounting bracket 14 can be made precisely such that the fiber optic path 22 is in precise alignment with the circuitry target 24. However, if the daughter circuit board 12 moves relative to the mother board 10, for example during shipping or installation, the alignment between the optic path 22 and the circuit target 24 may be negatively effected.

Accordingly, there is a need for a mounting bracket which allows the optical component to be mounted relative to the daughter board while maintaining the alignment of the components and within the parameters of optical equipment.

SUMMARY

The present invention relates to a bracket for mounting an optical component to a circuit board. The bracket comprises a bracket body member having a board contacting side and a component receiving side. A board contacting surface extending in a first plane is defined along the board contacting side. A component mount is defined along the body member with a termination surface extending adjacent the board contacting side in a plane recessed from the first plane.

BRIEF DESCRIPTION OF THE DRAWING(S)

FIG. 6 is an isometric view showing the assembled optical system.

FIG. 7 is an elevation view along the lines 7—7 in FIG. 6.

FIG. 8 is an isometric view of an alternative embodiment of the present invention.

DETAILED DESCRIPTION OF THE PREFERRED EMBODIMENT(S)

The preferred embodiments will be described with reference to the accompanying drawing figures where like numerals represent like elements throughout.

Figure 1:
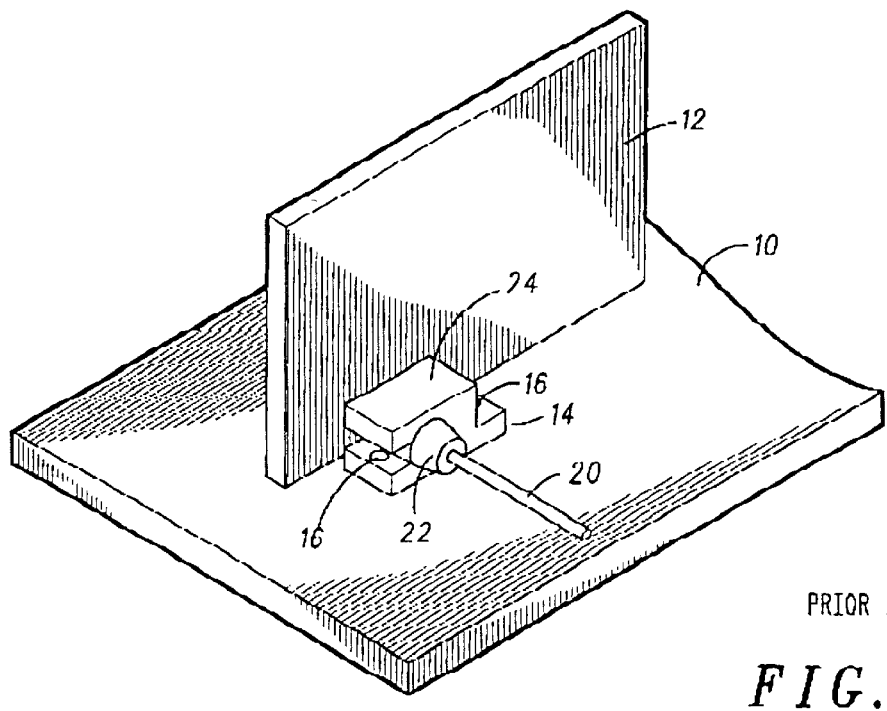
FIGS. 1 and 2 are isometric views of a prior art device used for mounting an optical component relative to a vertical plug in circuit board.
Figure 2:
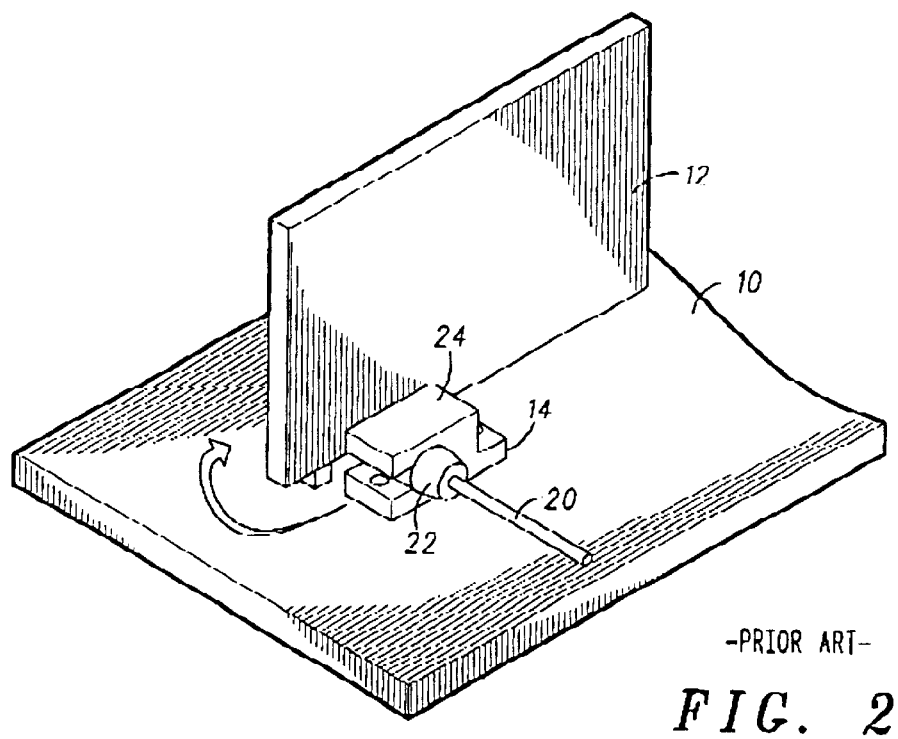
Figure 3:
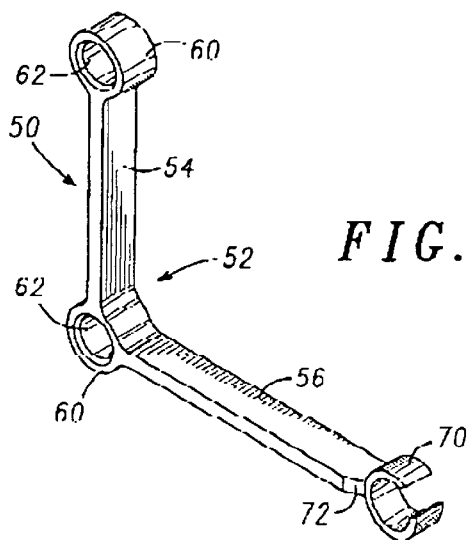
FIG. 3 is an isometric view of a mounting bracket of the present invention.
Figure 4:
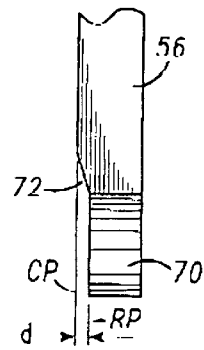
FIG. 4 is a top plan view of the mounting bracket along the lines 4—4 in FIG. 3.
Figure 5:
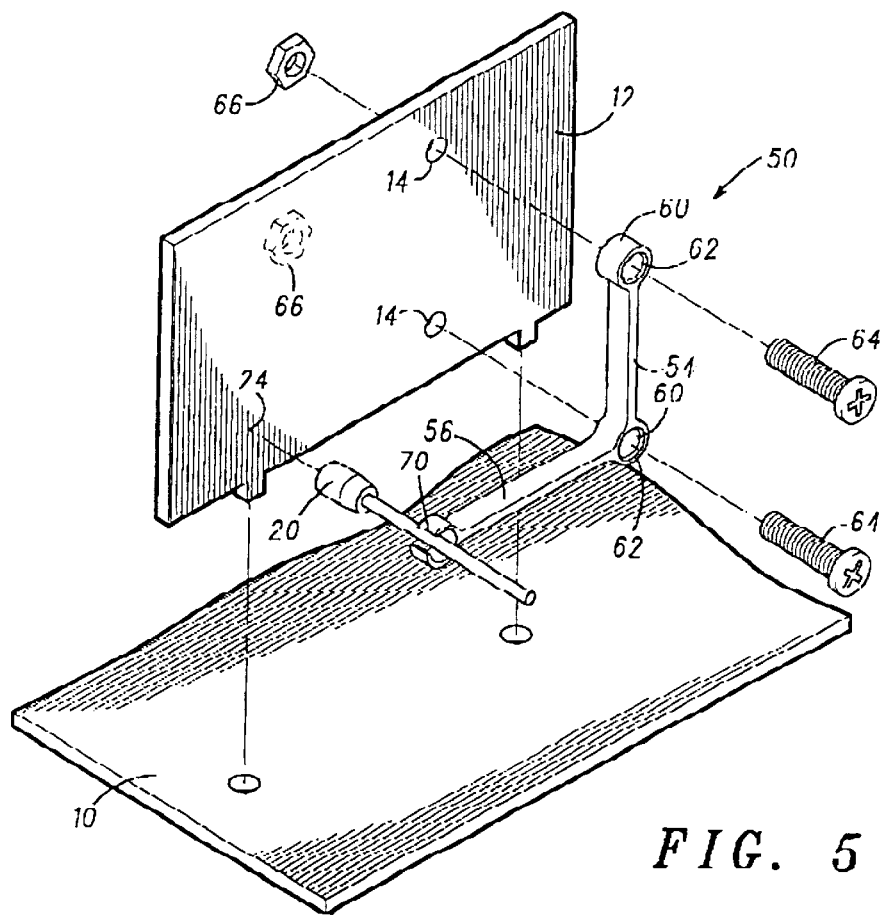
FIG. 5 is an exploded isometric view showing assembly of the optical components relative to the mother and daughter circuit boards.

Referring to FIGS. 3 and 4, a first embodiment of the bracket 50 of the present invention is shown. The bracket 50 is defined by a body 52 having connection means 60 and an optical component mount 70. In the illustrated embodiment, the body 52 is defined by legs 54 and 56 defining an L-shaped structure. The connecting means 60 are positioned along one leg 54 and the component mount 70 is positioned along the other leg 56. In the illustrated embodiment, each connecting means 60 is defined by a through hole 62 through which a fastener 64 may be passed and secured. However, other connecting means, for example, threaded posts, snap clips, etc. may be utilized. The illustrated component mount 70 is a C-shaped clip sized to receive and support a round optical component 20. The mount 70 can have varying sizes and configurations to complement various components 20. Referring to FIG. 5, the mount and connecting means 60 are oriented such that the bracket 50 can be installed directly to the vertical daughter board 12. In this embodiment, the axes of the connecting holes 62 and the axis of the mount structure 70 are parallel to one another. Such allows the optical component 20 to be mounted directly to the daughter board 12 without risk of bending or otherwise damaging the optical fiber.

Referring to FIGS. 3 and 4, a leading edge of the bracket body 52 defines a contact plane CP. This is the plane that is in contact with the daughter board 12 when the bracket 50 is mounted thereon. As can be best seen in FIG. 4, the leading edge of the contact mount 70 extends along a plane RP which is recessed a distance d from the contact plane CP. As a result, when the bracket 50 is secured to the daughter board 12, as illustrated in FIGS. 6 and 7, a gap 80 exists between the component mount 70 and the daughter board 12. The gap 80 provides clearance for the component 20 leads (not shown) and insures that the bracket 50 does not impinge on the integrity of the daughter board circuitry.

Referring to FIG. 4, the recessed area 72 can be formed during formation of the bracket 50, for example, during the extrusion process, or maybe formed through a secondary process, for example a post extrusion shaving process. The gap 80 distance d can be defined based on the requirements of a desired application. The bracket 50 is preferably manufactured from aluminum, but may be manufactured from other materials, including, but not limited to other metals or synthetics.

Referring to FIG. 8, an alternative embodiment of the bracket 100 is shown. In this embodiment, the bracket body 52 is defined with a constant forward plane. The gap 80 is thereafter defined by standoffs 110 positioned along the body 52. In the illustrated embodiment, the standoffs 110 constitute washers or the like aligned with the connecting means 60, however, the standoffs can be positioned at various locations, for example, as blocks extending along the respective arms 54 and 56 (not shown). Additionally, the standoffs 110 can be formed integrally with the bracket 52, for example, during the extrusion process, or maybe independent components as illustrated.

What is claimed is:

1. A bracket for mounting an optical component to a circuit board, the bracket comprising:

a bracket body member having a board contacting side and a component receiving side with at least one board mounting zone defined along the board contacting side which defines a board contacting surface extending in a first plane, wherein the bracket body comprises a generally L-shaped member having first and second legs, the first and second legs defining a plane that is parallel to a major surface of the circuit board when the bracket is attached to the circuit board; and a component mount defined along the body member with a termination surface extending adjacent the board contacting side in a plane recessed from the first plane.

2. The bracket of claim 1, wherein the at least one board mounting zone comprises at least one spacer.

3. The bracket of claim 1, wherein the bracket body is configured so that a gap exists between the termination surface and the circuit board when the bracket is disposed on the circuit board.

4. The bracket of claim 3, wherein the gap is adapted to allow a portion of the optical component to be directly connected to the circuit board, the portion extending part way through the circuit board.

5. An optical component mounting assembly comprising:

a circuit board; and a bracket member connected to the circuit board having at least one mounting zone which defines a board contacting surface extending in a first plane, the bracket having a component mount defined there along and having a termination surface which extends in a plane recessed from the first plane such that a gap is defined between the termination surface and the circuit board, wherein the bracket member comprises a generally L-shaped member having first and second legs, the first and second legs defining a plane that is parallel to the circuit board when the bracket member is attached to the circuit board.

6. The assembly of claim 5, wherein the at least one mounting zone comprises at least one spacer.

7. The assembly of claim 5, wherein the gap is adapted to allow at least a portion of an optical component to be directly connected to the circuit board, the portion extending part way through the circuit board.

* * * * *